April 19, 1927.

L. ROSENBERG 1,624,982

APPARATUS FOR CLEANING METAL PARTS

Filed May 14, 1926    2 Sheets-Sheet 1

Inventor
Louis Rosenberg

By Lester L. Sargent

Attorney

April 19, 1927.  L. ROSENBERG  1,624,982
APPARATUS FOR CLEANING METAL PARTS
Filed May 14, 1926  2 Sheets-Sheet 2

Inventor
Louis Rosenberg
By Lester L. Sargent
Attorney

Patented Apr. 19, 1927.  1,624,982

UNITED STATES PATENT OFFICE.

LOUIS ROSENBERG, OF MILWAUKEE, WISCONSIN.

APPARATUS FOR CLEANING METAL PARTS.

Application filed May 14, 1926. Serial No. 109,201.

Figure 1:
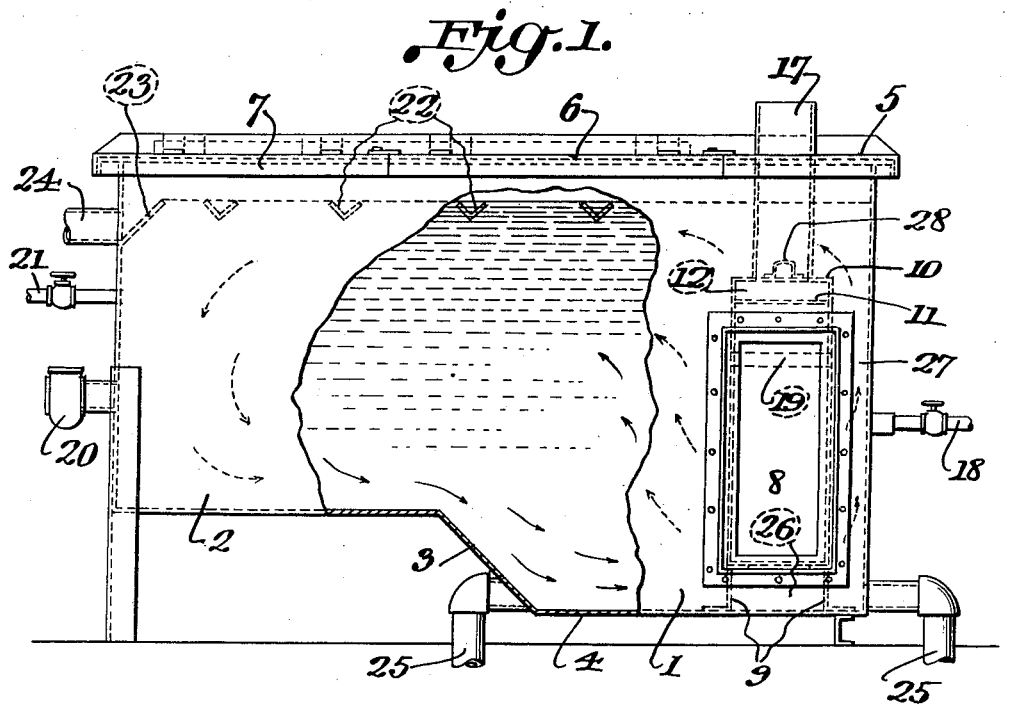
Figure 2:
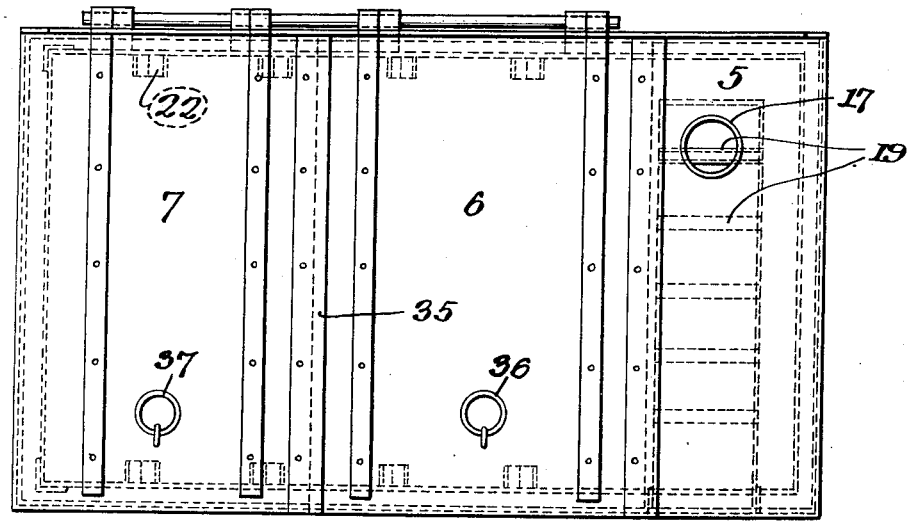
Figure 3:
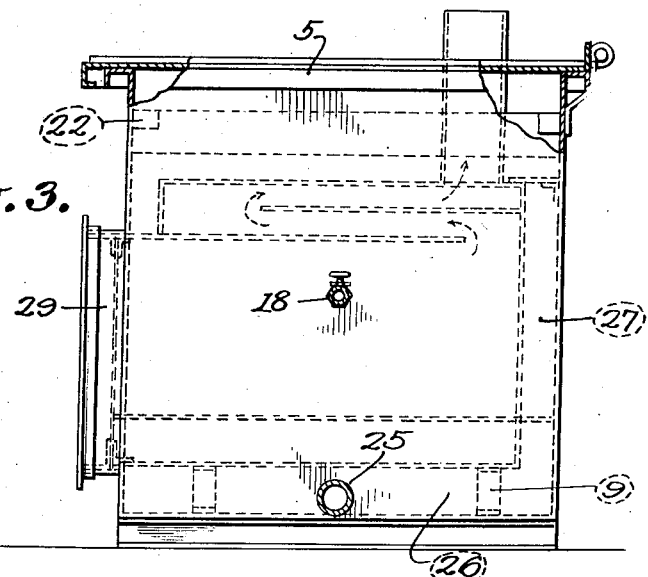
Figure 4:
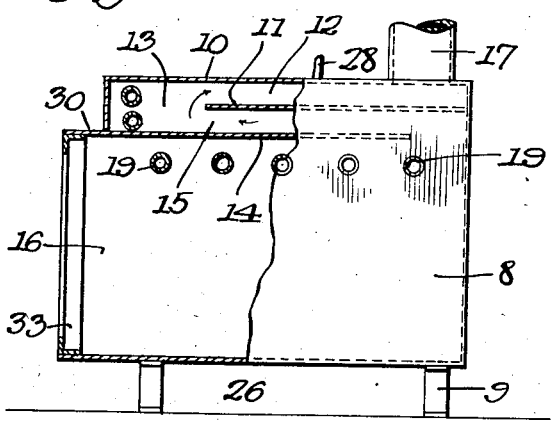
Figure 5:
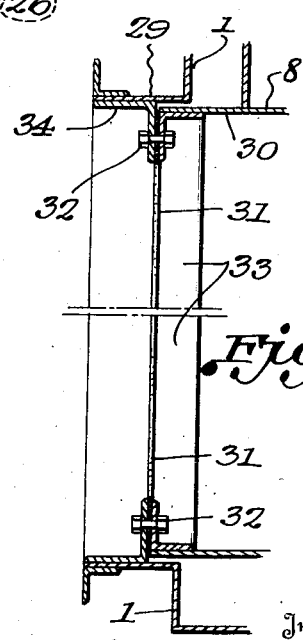

The object of my invention is to provide an improved apparatus for use in cleaning metal parts by means of a cleaning solution; to provide an apparatus of this type in which the heater is positioned within the cleaning tank; to provide a cleaning tank of novel shape whereby to produce the desired circular motion of the cleaning fluid advantageously; to provide the novel combination and arrangement of parts disclosed in the accompanying drawings and hereinafter described. I attain these and other objects of my invention by the apparatus shown in the drawings, in which—
Figure 1 is a side elevation of my invention with a portion of the side wall of the tank broken away;
  Fig. 2 is a top plan view;
  Fig. 3 is an end elevation;
Fig. 4 is a view, partly in side elevation and partly in section of the heater; and
  Fig. 5 is a detail sectional view showing the connection between the heater element and the washing tank.
Like numerals indicate like parts in each of the several views.
  Referring to the accompanying drawings, I provide a tank 1 having an elevated floor 2, a sloping floor 3 and a lower lowered floor 4. In the end of the tank having the lowered floor I provide a heater or firebox 8 supported in spaced relation to the floor 4 by legs 9, thus providing a space 26 under the heater and also having a space 27 intervening between the heater 8 and the adjacent end of the tank. Positioned over the heater 8 is a lid 5 which is removably mounted on the tank but which is not hinged as it is not frequently lifted. I provide a middle lid 6 which is hinged to the tank and which has a handle 36 and I also provide an outer lid 7 also hinged to the tank and which has a handle 37. This lid is mounted over that portion of the tank having the elevated floor 2. Affixed to lid 7 is a strip 35 which overlaps the adjacent edge of lid 6 so that when lid 6 is raised it will also raise lid 7, but lid 7 may be raised without raising lid 6.
Heater 8 is provided with a suitable lid 10 which has a handle 28 for lifting the entire heater out of the tank when necessary for cleaning. As shown in Fig. 4, I provide a baffle plate 11 descending part way under lid 10 and in spaced relation thereto to provide the chamber 12 leading to the smoke stack 17 at one end and to the passage 13 at the other end which communicates with the chamber or passage extending between baffle plate 11 and a second baffle plate 14 which is mounted on the opposite end of the heater as illustrated, and which communicates with the interior 16 of the heater. I provide a plurality of pipes 19 extending through the upper portion of heater 8 to permit of the circulation of the contents of the tank therethrough, to facilitate heating same.
  Referring to Fig. 1, I provide a valve-controlled inlet pipe 18 opening into tank 1 at the end in proximity to the heater. At the opposite end of the tank I provide a valve-controlled pipe 21 for injecting steam or compressed air from a suitable source to agitate the contents of the tank. I also provide a suitable thermostat 20, indicated diagrammatically in Fig. 1. I provide oppositely arranged lugs 22 on opposite sides of the tank on the inner walls thereof which may function either as a means for supporting bars from which articles to be immersed in the solution in the tank are suspended; or from which the articles themselves may be directly suspended.
  I provide a suitable skimmer plate 23 arranged near the upper portion of the tank at the end having the elevated floor and directly below and opposite the grease discharge pipe 24, as indicated in Fig. 1. I provide opposite valve-controlled drain pipes 25 opening out of the bottom of the tank immediately above, or in a line with, the lowered floor 4, as shown in Fig. 1.
  Referring to Fig. 5, I provide a flange 29 on tank 1 which engages with angle iron support 34, which support is secured by bolt 32 to the angle iron support 33 which supports the flange or extension 30 of the heater 8. I provide suitable asbestos packings 31 between angle iron supports 33 and 34.
In operation the tank is filled with water through the valve-controlled pipe 18 and the desired chemicals and the metal parts to be cleaned are placed in the tank supported from lugs 22. The chemical cleaning solution is circulated in the direction indicated by the arrows in Fig. 1 there being a clearance entirely around the heater so that the solution may flow through passage 26 under the bottom of the heater, up the space 27 between the heater and the adjacent end of the tank and back over the top of the heater to the other end of the tank and down toward the elevated floor 2 and thence down the sloping floor 3 to the last floor 4 and back under the heater to follow the course just described. Additional surface for liquid contact with the heater is provided by means of a plurality, preferably 8, tubes 19 that pass through the heater. The sloping floor 3 is important in maintaining circulation and an even temperature in the solution; this dip in the floor takes the liquid from the elevated portion of the floor 2 and sends it to the lowered floor 4, thus ensuring continuous circulation. Steam or compressed air may be injected into the tank through the valve-controlled pipe 21. Grease removed from the metal parts naturally rises to the top of the solution and is caught by skimmer plate 23 and flows over through the grease discharge pipe 24. Sediment may flow out through the opposite valve-controlled drain pipes 25. The temperature of the solution is regulated by the thermostat 20. Compressed air or steam may be forced into the tank through the valve-controlled pipe 21 for the purpose of agitating the contents of the tank, or this line of pipe may be used as a withdrawal line of the liquid cleaning solution to a suitable rotary or centrifugal pump.

The baffle plate in the heater retards the escape of the heat units to the stack and provides a more efficient utilization of the heat.

It is within the contemplation of my invention to provide a fire-box or heater that can use either reclaimed waste, crankcase oil, fuel oil, distillates, gasolene, kerosene, artificial or natural gas, as the fuel.

The pump may be used to deliver a spray or stream of the cleaning solution against large metal parts that are too large to be suspended in the solution in the tank.

It is also within the contemplation of my invention to utilize the apparatus for the cleaning of textiles as well as of metal parts, and also for general boiling operations. The 8-inch sloping floor with the two different floor levels has been attained after considerable experimentation and makes it possible to maintain the entire volume of the solution at a uniform heat.

What I claim is:

1. In a chemical solution tank for use in cleaning metal parts, the combination of a tank having hinged lids, an elevated floor at one end of the tank, a lowered floor at the other end of the tank, a sloping floor connecting the elevated and lowered floors of the tank, a heater mounted in the tank on and in spaced relation to the lowered floor and to the adjacent end of the tank and valve-controlled drain conduits opening out of the lowermost portion of the tank.

2. In a chemical solution tank for use in cleaning metal parts, the combination of a tank having hinged lids, an elevated floor at one end of the tank, a lowered floor at the other end of the tank, a sloping floor connecting the elevated and lowered floors of the tank, a heater mounted in the tank on and in spaced relation to the lowered floor and to the adjacent end of the tank, valve-controlled drain conduits opening out of the lowermost portion of the tank, and a valve-controlled conduit for the admission of steam or compressed air into the tank at the end thereof adjacent the elevated floor.

3. In a chemical solution tank for use in cleaning metal parts, the combination of a tank having hinged lids, an elevated floor at one end of the tank, a lowered floor at the other end of the tank, a sloping floor connecting the elevated and lowered floors of the tank, a heater mounted in the tank on and in spaced relation to the lowered floor and to the adjacent end of the tank, valve-controlled drain conduits opening out of the lowermost portion of the tank, a valve controlled conduit for the admission of steam or compressed air into the tank at the end thereof adjacent the elevated floor, the tank having a removable lid arranged above the heater through which the stack from the heater extends, and also having a plurality of hinged lids extending over the remaining portion of the tank.

4. In a chemical solution tank for use in cleaning metal parts, the combination of a tank having hinged lids, an elevated floor at one end of the tank, a lowered floor at the other end of the tank, a sloping floor connecting the elevated and lowered floors of the tank, a heater mounted in the tank on and in spaced relation to the lowered floor and to the adjacent end of the tank, valve-controlled drain conduits opening out of the lowermost portion of the tank, a valve-controlled conduit for the admission of steam or compressed air into the tank at the end thereof adjacent the elevated floor, the tank having a removable lid arranged above the heater through which the stack from the heater extends, and also having a plurality of hinged lids extending over the remaining portion of the tank, one of said hinged lids having a strip overlapping the other hinged lid whereby the opening of one of the hinged lids will also operate the other, but not vice versa.

5. In combination with the apparatus described in claim 1, a grease trap and grease discharge conduit at one end of the tank and a valve-controlled conduit at the opposite end of the tank for use as a water inlet.

LOUIS ROSENBERG.